United States Patent [19]

Auger

[11] 4,226,506
[45] Oct. 7, 1980

[54] SWIVELING SOLAR REFLECTOR WITH MULTIPLE REFLECTING ELEMENTS SUPPORTED BY PREFABRICATED CAMBERED MEMBERS

[75] Inventor: Robert H. Auger, Le Vesinet, France
[73] Assignee: Saint-Gobain Industries, Paris, France
[21] Appl. No.: 27,476
[22] Filed: Apr. 5, 1979
[30] Foreign Application Priority Data
  Apr. 10, 1978 [FR]  France .................. 78 10508
  Nov. 10, 1978 [FR]  France .................. 78 31808
[51] Int. Cl.³ ............................................ G02B 7/18
[52] U.S. Cl. .................................... 350/292; 350/310
[58] Field of Search .............. 350/292, 295, 299, 310; 353/3; 126/438

[56] References Cited
U.S. PATENT DOCUMENTS

| 2,707,903 | 5/1955 | Trombe | 350/292 |
| 2,968,033 | 1/1961 | Kreitzberg | 350/292 |
| 4,150,874 | 4/1979 | Grassin et al. | 350/292 |

FOREIGN PATENT DOCUMENTS 2738596  3/1979  Fed. Rep. of Germany ........... 126/438
2344852 10/1977  France .

Primary Examiner—Jon W. Henry
Attorney, Agent, or Firm—Pennie & Edmonds

[57] ABSTRACT

A solar reflector made up of a plurality of contiguous rectangular panels which are mounted by supporting framework onto a rigid rotatable member which may rotate with respect to a fixed base. The framework includes a plurality of joists where each joist comprises a cambered member connected to a beam which in turn connects with a girder forming part of the rigid rotatable member. Each cambered member supports a long side of a reflector panel. Adjustment means are provided for moving a beam with respect to a girder whereby associated reflector panels may be accurately positioned with respect to the rigid rotating member.

A method by which a solar reflector comprising a plurality of panels may be positioned with respect to a rigid supporting base where the panels are supported by a framework comprising a plurality of joists formed by parallel beams adjustably connected to girders which in turn form part of the rigid supporting base including the step of establishing a reference plane by means of a laser and a rotating prism and the step of moving a beam with respect to a girder by the adjustment means in order to bring electronic sights carried by a cambered member connected to the beam into the reference plane.

14 Claims, 8 Drawing Figures

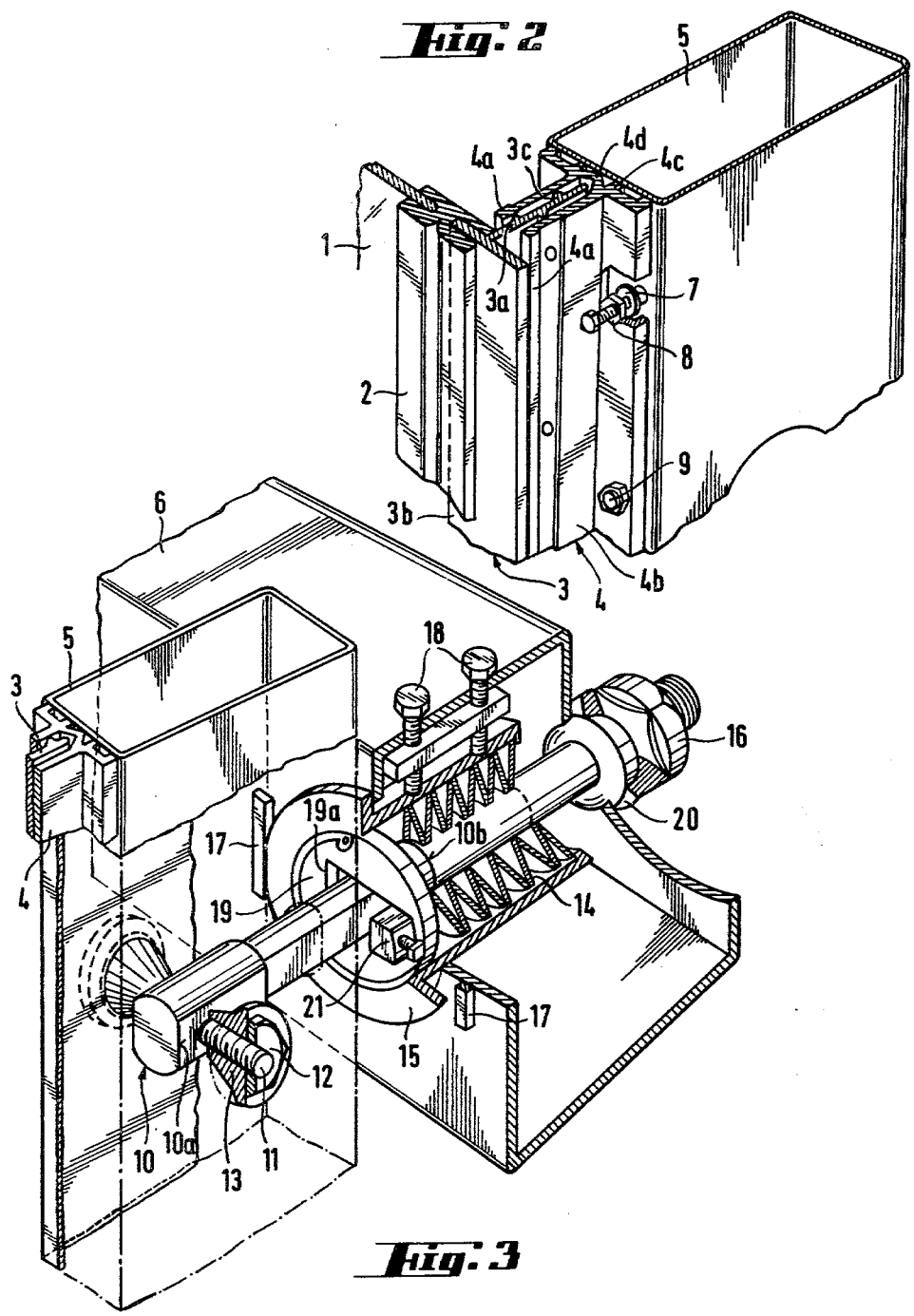

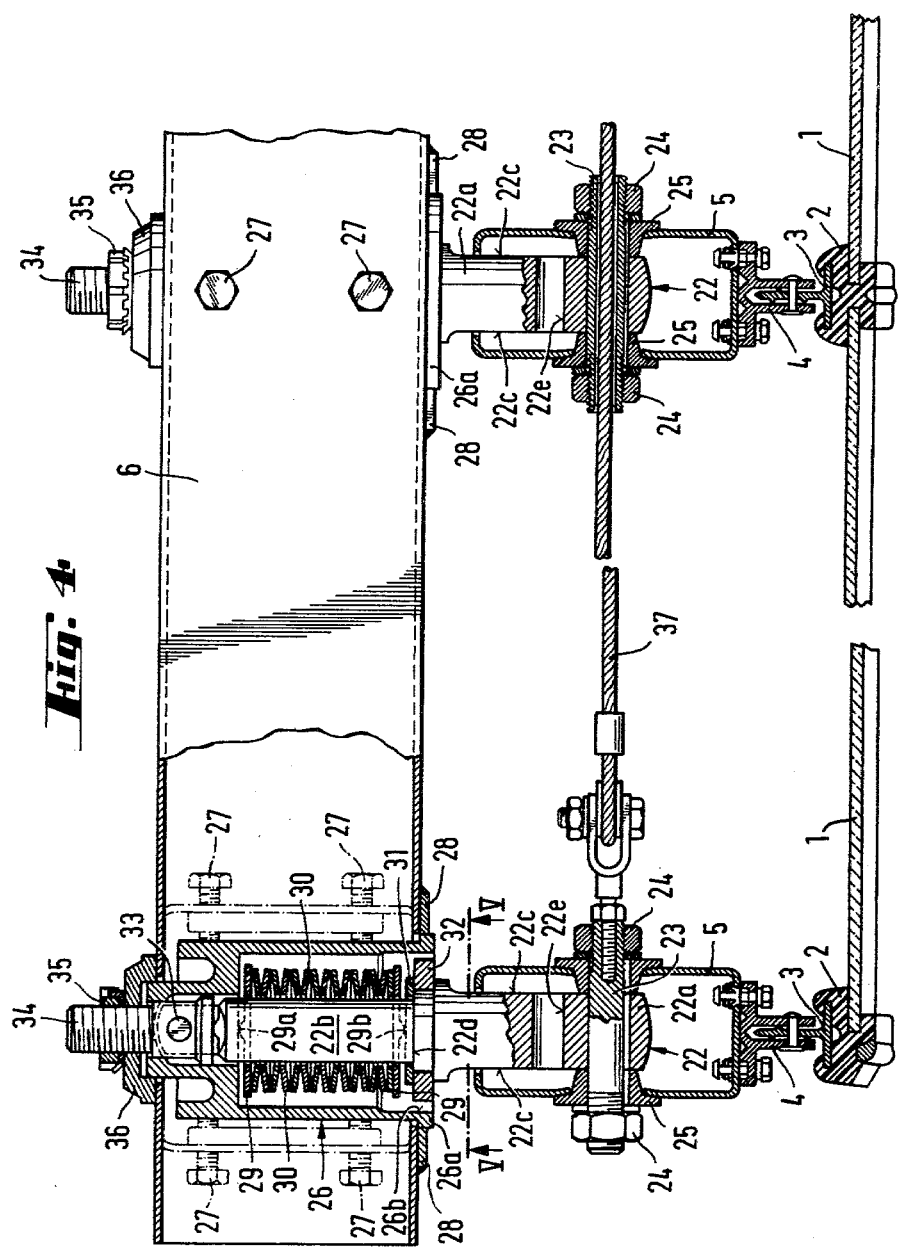

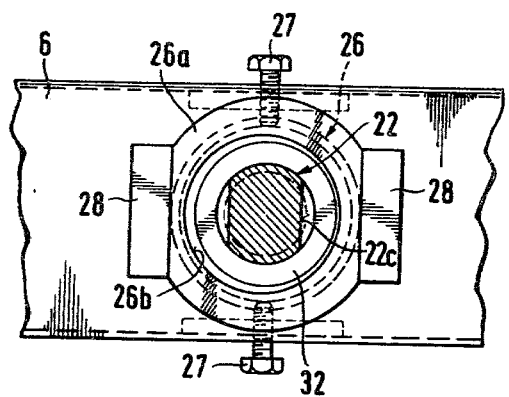
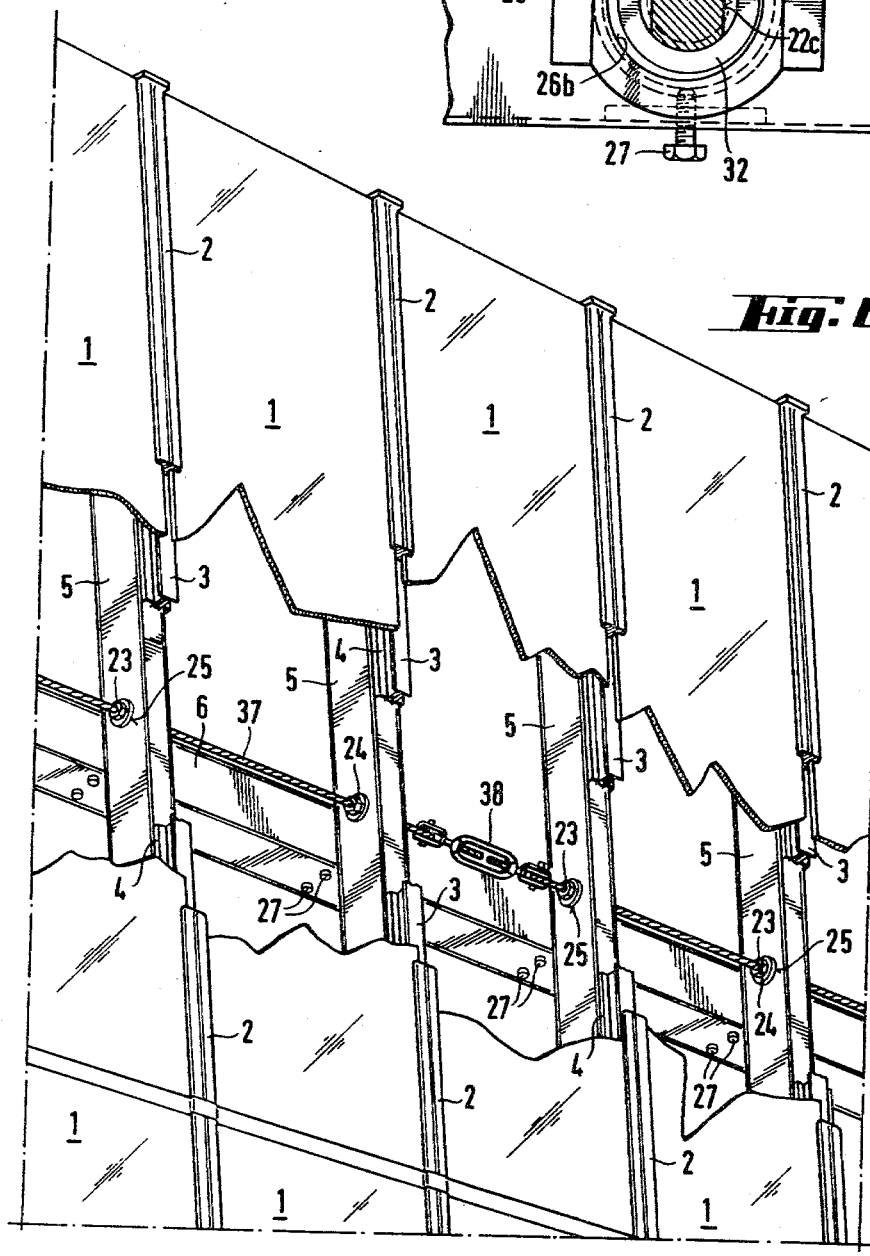

SWIVELING SOLAR REFLECTOR WITH MULTIPLE REFLECTING ELEMENTS SUPPORTED BY PREFABRICATED CAMBERED MEMBERS

TECHNICAL FIELD

The invention relates to a swiveling solar reflector with multiple reflecting elements supported by prefabricated curved or cambered members. More specifically, the invention relates to a concave reflector of the type where the reflecting surface is made up of elongated rectangular panels, the long sides of which are supported by cambered or curved members which impart a precise cylindrical curvature to the panel while the short sides remain free.

BACKGROUND ART

Solar reflectors are intended for equipping solar power plants, which, in a known manner, usually comprise a large number of mirrors, arrayed along the arcs of concentric circles, in order to reflect solar radiation to a boiler positioned at the top of a tower and located in the center of the array of mirrors. The boiler feeds steam to a turbine located at the base of the tower which in turn drives an electrical generator. Naturally it is necessary periodically to change the orientation of each of the mirrors in order for the reflected solar light to continue to be projected onto the boiler and, with a view to achieving this, the mirrors are mounted on adjustable bases, the position of which is automatically adjusted at regular intervals.

In order to prevent the luminous spot formed by each mirror on the receiver of the boiler from spreading beyond the limits of the receiver, the mirrors must be close in shape to a large radius spherical mirror.

Such reflectors must fulfill a certain number of requisites, among which are the following:

(a) they must be relatively inexpensive, in order for the solar power station to be competitive with traditional electrical generating plants;

(b) they must be reliable, so as to curtail replacement, maintenance and adjustment costs;

(c) they must keep a shape close to that of the ideal convergent mirror, in spite of deformation due to wind, heat and their own weight; and (d) they must be relatively lightweight, in order to simplify the design of the swivel base.

With a view to meeting these conditions, it has already been proposed, by the Saint-Gobain Techniques Nouvelles corporation, in French Patent Application Ser. No. FR 76 07756 and published under number FR 2 344 852, to build convergent reflectors comprising a frame which supports a plurality of reflecting elements or panels, at least one of which is appreciably cylindrical and results from the deformation of a rectangular flat strip. Each of the panels are carried on the frame by means of elastomer edge strips which engage the long sides of the panels and also engage flanges formed integrally with the frame.

In constructing these reflectors, the rectangular reflecting strips are deformed at the work site by means of bending stresses applied along the entire length of the long sides of the strips when they are put into place on the supporting frame, while the short sides are left free during the bending of the long sides. More specifically, elastic deformation is imparted at the work site to a sectional member by the use of a template where the sectional member is destined to support the edge strip of a reflector panel and the sectional member thus deformed is fastened to the reflector frame.

In ordinary practice, reflectors of this type made in this manner comprise part of a rigid structure which can be directed in different directions with respect to a base anchored to the ground and where the rigid structure has a flat framework which supports T irons, arranged for example in vertical or horizontal lines, forming cambered members which are brought onto the reference sphere by shaping. A shaping machine rolling on curved rails and equipped with a template arranged in a vertical plane makes it possible to place and fix each sectional member on a beam in the desired position, after it has been cambered to the desired curvature.

This method makes it possible to rapidly assemble each mirror, but it requires a heavy, costly forming structure. This method also has the drawback that it can be utilized only at the site where the mirror is to be installed.

It is therefore an object of my invention to provide mirrors of the same general type as discussed above and which lend themselves to rapid assembly but which are more economically assembled in view of the fact that they do not require the use of a machine for forming the structural members one by one opposite each mirror at the work site.

It is an object of the invention to provide for a swiveling solar reflector the reflecting panels of which are supported by prefabricated cambered members which are assembled at the erection site of the reflector before installing the reflecting panels, after which the necessary adjustments are made to bring the panels into proper positioning.

BRIEF SUMMARY OF THE INVENTION

The invention relates to a solar reflector comprising a rotatable structure which can be oriented in different directions with respect to a fixed base and which supports a framework comprising parallel joists having members cambered to the curvature of the reflector. A plurality of rectangular reflector panels are firmly fixed on their long sides to the cambered members by means of flexible edge strips with the short sides being left free. The cambered members in turn are mounted on parallel beams which form joists to constitute a framework. The beams are mounted onto girders forming part of the rigid rotatable structure. The girders extend transversely to the beams and cambered members and follow the curvature of the reflector.

The cambered members can advantageously be fixed on the beams by means of auxiliary sectional members each having a T cross-section, the flange of which rests on a beam and the web of which comprises a lengthwise slot into which the web of a cambered member is inserted and fastened.

In actual practice the auxiliary structural members will be mounted on the beams at the factory with the sides of the slot in the split webs constituting clamps for holding the webs of the cambered members. The slots will be made rectilinear by means of an appropriate system of adjustment. The cambered members, advantageously in the form of a T, will subsequently be mounted and shaped in the clamps by means of a template. In this manner assemblies of joists equipped with cambered members are obtained which subsequently have only to be assembled with the other components of the frame at the site of erection of the reflector.

The flanges of the auxiliary structural members can advantageously comprise a deformable part so as to facilitate the alignment of the slots forming the clamps during assembly and to make it possible to bring the two sides of each slot parallel to one another at the time when the cambered member and the auxiliary sectional member are joined together, as for example, by riveting.

Also preferably the webs of the cambered members have parallel ridges on their lateral surfaces intended to facilitate the introduction of the webs into the slots and subsequently to constitute a good seat for the supporting clamping action.

The joists are assembled on the girders of the rotatable rigid structure by means of spindles or pins provided with adjusting members whereby it is possible to effect longitudinal adjustments of the distance between the beams of the joists and the rotatable rigid structure and also to effect radial corrections of the respective positions of the panels at the surface of the mirror. More precisely, the beams are assembled on the girders by means of spindles or pins which extend substantially perpendicular to the longitudinal directions of the girders and associated beams. Each pin, which is rigidly connected to a beam, passes through a housing contained within a girder. Each pin rests on a horizontal bearing surface within the housing whereby the weight of the reflecting panels and of their adjustable framework is transferred to the housing. Each pin is further inserted into a fixing member equipped with a means for axially adjusting the pin.

The reflector assembly is also equipped with means of radial adjustment intended for radial or transverse corrections, whereby it is possible to tighten down the joists at the end of the reflector assembly in order to make the structure non-deformable.

Each pin is preferably pulled back into its housing by means of an elastic member so that the housing is pressed against the surface of a girder with axial adjustment of the pins being effected by tightening of a fixing member against the opposite side of the girder.

For the purpose of tranverse adjustment, the fixing members are preferably provided with a means for swiveling of the pins with respect to the rigid rotatable structure. To this end each pin preferably rests on the horizontal bearing surface in the housing by means of a disc and the end of the pin is connected with the adjustable fixing member by a spindle passing through the vertical axis of the pin.

The adjusting member may advantageously comprise a cap provided with a threaded rod onto which a tightening nut is screwed. The nut presses against the corresponding side of a girder when screwed down on the cap to draw the pin back and pulls on the elastic member.

The elastic member bears partly on the pin and partly on the housing by means of two washers having ribs which enable the elastic member to swivel without slipping when the pin makes transverse movements.

In accordance with a further feature of the invention, advantage is taken of the flexibility of the parts making up the reflector by uniting the beams by cables which pass through and are perpendicular to the beam. Tension members integral with the cables are provided in order to pull in the beams located along the two parallel sides of the reflector towards one another to ensure that all the reflector panels are securely engaged in the channels of the edge strips. This has the effect to render the reflector assembly non-deformable and to have the reflector panels participate in the rigidity of the structure. In this manner great flexibility of adjustment is achieved, not only in the direction perpendicular to the reflector surface but also in the direction of its surface.

In accordance with a still further characteristic of the invention, the adjustment of the portions of the cambered members supported by the beams is effected by means of a laser utilizing a revolving prism to define a plane of reference with respect to which the position of each cambered member is adjusted by bringing sights integral with the cambered members into the reference plane.

BRIEF DESCRIPTION OF THE DRAWINGS

FIG. 2 is an enlarged partial view in perspective illustrating connection of a cambered member to a beam of the solar reflector of FIG. 1;

FIG. 3 is an enlarged partial view in perspective with cut-away portions illustrating connection of a beam with a girder of the solar reflector of FIG. 1;

FIG. 4 is a horizontal view in partial section illustrating a further form of connection of a beam with a girder;

FIG. 5 is a cross-section of a fixing pin taken along line V—V of FIG. 4;

FIG. 6 is a partial view in perspective with cut-away portions illustrating a cable connection between beams;

DETAILED DESCRIPTION OF THE PREFERRED EMBODIMENTS

Figure 1:
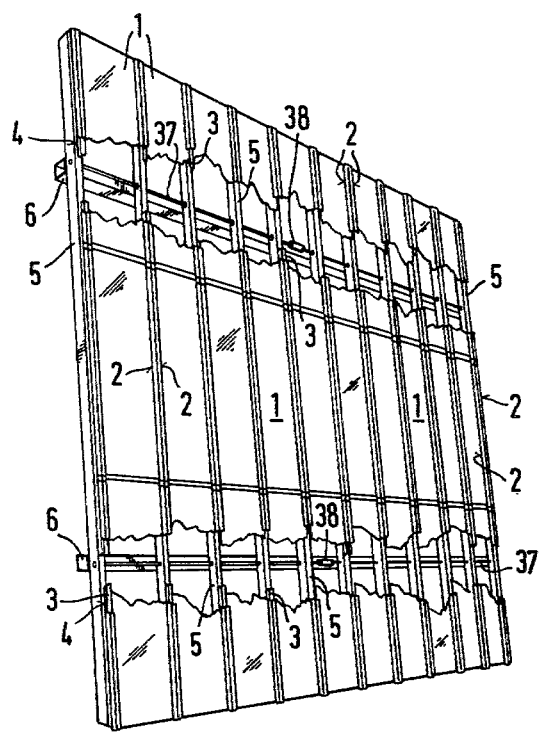
FIG. 1 is a perspective view with cut-away portions of a solar reflector constructed according to the invention.
Figure 7:
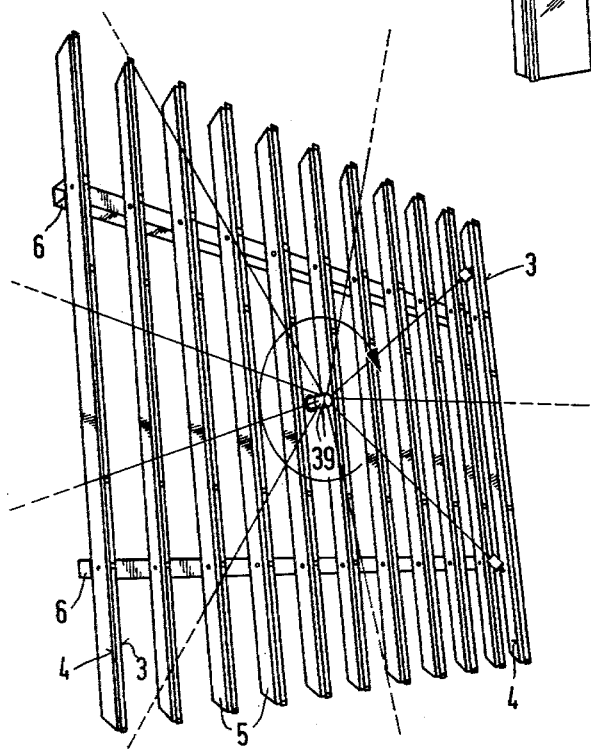
FIG. 7 is a perspective view of a framework of a solar reflector illustrating placement of a laser rotating prism assembly used to establish a reference plane to which cambered members supporting reflector panels may be referenced.

Referring to FIGS. 1-3 there is illustrated a reflector constructed in accordance with the invention comprising a plurality of rectangular reflector panels 1 supported along their long sides by elastomer edge strips 2. Strips 2 are in turn fastened to the cambered flanges of T-shaped supporting structural members 3, the webs of which are inserted in longitudinal slots contained in auxiliary structural members 4 which are also T-shaped in cross-section. Structural members 4 are connected at their flanges with a surface of hollow beams 5 to constitute a framework for the reflector. Beams 5 in turn are connected to hollow girders 6 which form part of a rigid rotatable structure which is rotatable with respect to a fixed base.

Beams 5 are rectilinear structural sections having a rectangular cross-section and are rough drawn. Two wings of a T-shaped auxiliary structural member 4 are applied to one side of a beam such that the web of the T-shape comprises two branches 4a and 4b which define a longitudinal U-shaped slot. In order to make the slots in the sectional member 4 rectilinear, cams 7 are provided which act transversely on thrust ribs 4c to bend the member in zone 4d with the cams being locked by means of nuts 8. The flanges of the structural member 4 are fastened to the beam 5 by means of nuts 8 and bolts 9 or analogous assembling means. The adjusting and the assembly of the structural members 4 onto the beams 5 is done at the factory.

The web 3a of the cambered T member 3 is also inserted at the factory into the slot defined by the branches 4a and 4b of the auxiliary structural member 4. The flanges 3b of the cambered member 3 acts as a cambered element which, by means of an edge strip 2 supports one long side of a reflector panel of the reflector as described in the aforementioned publication FR 2 344 852. After the beam 5 is placed flat on its side and after the web 3a of a cambered member 3 is inserted into the clamp formed by the branches 4a and 4b, the flange 3b is then cambered at the factory with the use of a template. After cambering the web 3a of the cambered member and the branches 4a and 4b of the auxiliary member are assembled, as for example, by riveting.

With a view to facilitating the insertion of the web 3a into the slot, ridges such as 3c are located parallel to one another on the external surfaces of the web 3a. Once the assembly of the cambered member into the auxiliary member is completed, ridges 3c further serve to provide a good seat for the cambered member 3. In order to facilitate the tightening of the branches 4a and 4b at the time of riveting, the central portion 4c of the structural member 4 is preferably deformable. It will be noted that all the operations of assembling the beams, the auxiliary members and the cambered members can be carried out in the factory thus considerably facilitating the operation of erection of the reflector on its site.

Joists, all of which are identical with one another, formed by the beams 5 and equipped with the auxiliary members 4 and cambered members 3 are then transported to the reflector site and equipped with bearing spindles or pins 10. A flattened head of each pin accommodates a rod 11 having two nuts 12 threaded thereon which tighten conical washers 13 against a beam with the washers clamping the beam before coming into contact with flats 10a or the pins 10.

Each joist is placed in a different position on the rigid rotatable member of the reflector in such a way that the assembly of beams 5 has a cylindrical shell and that the assembly of cambered members 3 form the desired concave surface. The beams 5 are fixed to the girders 6 forming part of the rigid rotatable member by means of pins 10, a shoulder 10b of which bears on conical washers or Belleville springs 14 inside a housing 15 inserted into holes in the girders 6. A nut 16 is threaded onto the end of each pin 10 in order to adjust the radial distance between a beam 5 and a girder. Each housing 15 is positioned horizontally in a girder by means of flats 17 located vertically along the front side of the girder. The vertical positioning of the housing is adjusted precisely by means of a set of bolts 18 placed laterally on either side of the housing.

Each housing 15 is fitted with a cover 19 in which there is a guide slot 19a, and the nut 15 is tightened through the intermediary of a spherical bearing 20 so that the pin 10 is able to pivot horizontally.

Each of the covers 19 of the housings 15 of the joists at the ends of the reflector has a threaded push rod 21 which is capable of pushing against a corresponding pin 10 in such a way as to bring about, little by little, the tightening of the joists after the reflector panels 1 have been installed in the edge strips 2 thus taking up any play between the edges of the panels 1 and the joints formed by their edge strips 2.

By eliminating the play in this way it is possible to cause all the reflector panels—which are non-deformable in their plane—to partake of the rigidity of the entire structure which enables the entire structure to be lightened to an appreciable extent. In the vicinity of the points at which the beams 5 are fastened to the girders, there are successively installed on the cambered members 3 a series of sights or patterns, staggered in the direction of the radius of the reflector by distances equal to the successive gaps to be imparted to the cambered members with respect to a reference plane parallel to the plane tangent to the middle of the reflector. Adjustment is effected by placing each of the characteristic sights of each cambered member in the reference plane by optically aligning the sights by means of a sighting system placed in the plane and by gradually tightening the nuts 16 of the fixing pins 10.

It will be noted that the erection of the components of the framework in accordance with the invention can be carried out easily at the work site without the need for any recourse to templates or similar devices of the prior art.

In the preferred embodiment shown in FIGS. 4 to 6, the beams 5 and the girders 6 are connected by means of an assembly pin 22, one end 22a of which is inserted into the inside of the beam 5, while its other end 22b is inserted into the girder 6.

The end 22a has a threaded rod 23 which passes therethrough and onto which there are screwed two nuts 24 forcing washers having a conical bearing surface 25 against the opposite surfaces of the beam 5 until they come to press against two opposite flats 22c on the pin 22.

The pin 22 passes through a housing 26 contained in the girder 6. The housing 26 is supported by a set of bolts 27 and has a collar 26a pressing against the surface of the girder 6 facing the beam 5 with the collar being centered vertically by means of two flat sides between guides 28.

Enclosed inside the housing between the two end washers 29 are concentric conical washers or Belleville springs 30 which serve as elastic return members for the pin 22. The washers 29 are mounted for an oscillating arrangement, and, for this purpose, one washer bears on the bottom of the housing 26 by means of a rib 29a while the other washer bears by means of a rib 29b on the shoulder 22d of the pin 22 through the intermediary of a washer 31. The washer 31 also serves to hold in place a disc 32 which, under the weight of the frame, rests on the horizontal bottom bearing surface 26b located at the entrance to the housing 26.

The end 22b of the pin 22 has a spindle 22 passing therethrough where the spindle has a threaded cap 34 which projects outwardly from the girder 6. A nut 35 is screwed onto cap 34 and presses by means of a washer 36 against a corresponding surface of the girder 6. Tightening the washer 35 compresses the conical washers and by drawing the pin 22 towards the back, tends to move the beam 5 towards the girder 6.

The pin 22 can further swivel about the spindle 33. On the beams 5, intermediate the ends of the reflector, the rods 23 are hollow and, as shown in FIGS. 4 and 6, constitute sheaths through which tension cables 37 can pass. A turnbuckle 38 is included by which it is possible to exert tension on the cables in such a way as to cause the end beams 5 situated on the edges of the reflector to be pulled towards one another this made possible by reason of the freedom of the pins 22 to pivot about their spindles 33. This movement of the end beams towards each other after the reflector panels 1 have been mounted insures that the panels will become completely inserted into the edge strips 2 to thus form a rigid structure that is non-deformable in its plane.

As has been explained above the auxiliary structural members 4 are mounted on the beams 5 at the factory and the supporting cambered members 3 are likewise put into place and precambered at the factory.

The design described theoretically makes it possible to use joists which are all identical with one another and adjusted to a desired position by tightening or loosening the longitudinal adjusting means of the pins 10 or 22, or, if necessary, by changing the number of conical washers which constitute the elastic retracting members for the pins. It is obvious, nevertheless, that it may be more convenient, especially on reflectors having a relatively high degree of curvature, to use several series of pins having different lengths between the shoulder 10b or 22d which serves as a bearing surface for the conical washers 14 or 30 and the rod 11 or 23 so that from the very outset the corresponding beams are installed at different distances from the girders with the tightening of the adjusting means serving solely for making the desired adjustments in order to bring the cambered members precisely into the desired position. Also it is possible, for example, to use pins 22 which have several holes 22e in them or an oblong opening.

Figure 8:
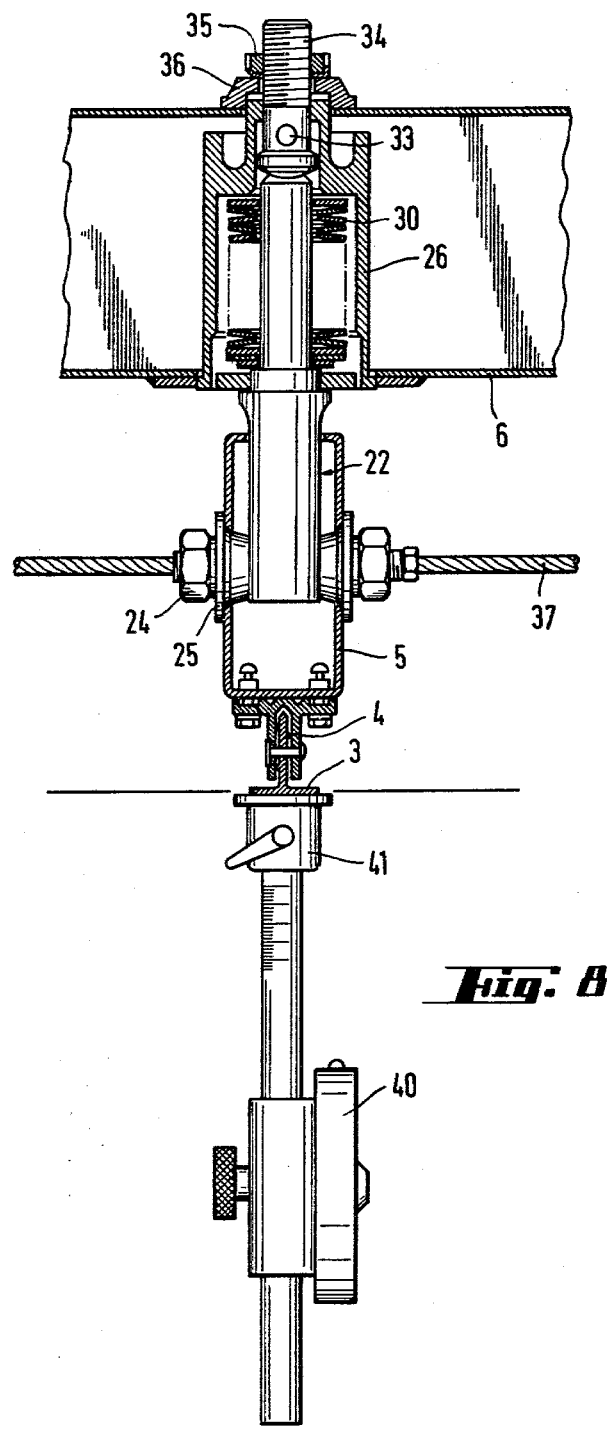
FIG. 8 is a detail view showing an electronic pattern device supported by a cambered member utilized in positioning the sectional member with respect to a reference plane.

In order to effect the final adjustment at the work site a prism associated with a laser 39 is installed on a fixed support for example, at the center of the framework, and is turned in order to define a reference plane. As shown in FIG. 8, an electronic pattern device 40 supported by a guage 41 is positioned on the flange of a cambered member 3. Once the position of the sight 40 with respect to the member 3 has been adjusted to the desired distance, the sight is then brought into the plane of the laser by means of adjusting members 34 and 35. It will be observed that this adjustment does not involve any play and that it is thus possible to proceed in a simple manner, on the site itself, to effect a fine adjustment of the position of the structural sections.

I claim:

1. A solar reflector having a plurality of contiguous rectangular reflector panels and a supporting framework for the panels adated to be connected to a rigid rotatable member which is rotatable with respect to a fixed base and which includes girders following the curvature of the reflector, and where the framework includes a plurality of joists formed by parallel extending beams having cambered members following the curvature of the reflector joined thereto and supporting the long sides of the panels and the beams extending transversely to and being connected to the girders, the improvement comprising in that said joists are identical, in that a pin integrally connects each beam of a joist with a girder, in that a housing for each pin is contained within each girder and in that a longitudinal adjusting means is included for longitudinally moving each said pin with respect to a girder to provide adjustment of a beam with respect to a girder and the rigid rotatable member.

2. A solar reflector according to claim 1 having in addition radial adjustment means for radially adjusting a pin and means for mutual transverse tightening of the panels.

3. A solar reflector according to claim 2 wherein some of said pins are connected for swiveling movement with respect to a girder.

4. A solar reflector according to claim 1 wherein each housing has a roller disc upon which a pin rests and in that the longitudinal adjusting means is connected to an end of a pin by a spindle passing through the longitudinal axis of the pin.

5. A solar reflector according to claim 4 wherein said longitudinal adjusting means comprises a threaded cap and a nut fitted thereon which is tightened against a surface of a girder.

6. A solar reflector according to claim 1 having in addition an elastic retracting member operatively positioned between a pin and a housing by means of two ribbed members whereby said elastic retracting member may oscillate with respect to said housing.

7. A solar reflector according to claim 6 wherein said elastic retracting member comprises a plurality of stacked conical washers which bear on the bottom of the housing and against a shoulder of the pin by means of said ribbed members.

8. A solar reflector according to claim 1 having in addition cables extending through said beams, and tension devices integral with said cables by which said beams located along two parallel sides of the mirror may be pulled towards each other to in turn move said panels towards each other until all the panels are firmly engaged by said cambered members.

9. A solar reflector according to claim 8 having in addition rods in the form of sheaths into which said cables are inserted with the rods passing through said beams and said pins and with the ends of each cable being connected to the rods associated with the beams placed along the edges of the reflector.

10. A solar reflector according to claim 1 wherein the cambered members have a general cross-section in the shape of a T and having in addition flexible edge strips connecting the flanges of the T-shaped cross-section and the long sides of the panels.

11. A solar reflector according to claim 1 having in addition a T-shaped auxiliary structural member for fastening each said cambered member to a beam wherein a flange of the auxiliary structural member rests on one surface of a beam and a web of the auxiliary structural member comprises a longitudinal slot into which a portion of a cambered member is inserted.

12. A solar reflector according to claim 11 wherein said beams have adjustable cams bearing on the flanges of the auxiliary structural members.

13. A solar reflector according to claim 11 wherein the flange of each T-shaped auxiliary structural member has a deformable central portion.

14. A solar reflector according to claim 11 wherein each said cambered member has a web with parallel ridges on its lateral surface.

* * * * *